United States Patent
Song et al.

(10) Patent No.: US 9,083,618 B2
(45) Date of Patent: Jul. 14, 2015

(54) CENTRALIZED BACKUP SYSTEM AND BACKUP METHOD FOR AN HOMOGENEOUS REAL-TIME SYSTEM AT DIFFERENT LOCATIONS

(75) Inventors: Hanshi Song, Shanghai (CN); Yu Chen, Shanghai (CN); Naigeng Ji, Shanghai (CN); Minggao Zhang, Shanghai (CN); Xiaoyi Wang, Shanghai (CN); Hao Miao, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 362 days.

(21) Appl. No.: 13/121,117

(22) PCT Filed: Aug. 7, 2009

(86) PCT No.: PCT/CN2009/000894
§ 371 (c)(1),
(2), (4) Date: Jul. 14, 2011

(87) PCT Pub. No.: WO2010/037247
PCT Pub. Date: Apr. 8, 2010

(65) Prior Publication Data
US 2011/0264624 A1    Oct. 27, 2011

(30) Foreign Application Priority Data
Sep. 26, 2008 (CN) .......................... 2008 1 0200564

(51) Int. Cl.
| G06F 17/30 | (2006.01) |
| G06F 7/00 | (2006.01) |
| H04L 12/24 | (2006.01) |
| G06F 11/20 | (2006.01) |

(52) U.S. Cl.
CPC ........ H04L 41/0856 (2013.01); G06F 11/2025 (2013.01)

(58) Field of Classification Search
None
See application file for complete search history.

(56) References Cited

U.S. PATENT DOCUMENTS

| 7,403,946 B1 * | 7/2008 | Taylor ........................... 707/612 |
| 7,941,622 B2 * | 5/2011 | Yagawa et al. ................. 711/162 |
| 2002/0035639 A1 * | 3/2002 | Xu ................................. 709/238 |

(Continued)

FOREIGN PATENT DOCUMENTS

| CN | 1447606 A | 10/2003 |
| CN | 1204762 C | 6/2005 |

OTHER PUBLICATIONS

Zhou Keji; "Solution of Disaster Recovery for Postal Integrated Network"; magazine—Designing Techniques of Posts and Telecommunications, p. 52-57; Issue 1 in 2005; published on Jan. 2005 in China, (abstract).

(Continued)

*Primary Examiner* — Alicia Willoughby
(74) *Attorney, Agent, or Firm* — Fraser Clemens Martin & Miller LLC; James D. Miller

(57) ABSTRACT

A centralized backup system for a non-local homogeneous real-time system comprises a switch (302), and a host (301), an encryptor (303), a PC monitor (304), and a firewall (305) which connect with the switch. The centralized backup system ensures the reliability of the non-local systems and is able to allocate resources flexibly to meet the requirement of the tasks of system in each different location by centralized deployment and centralized management of backup systems in all locations.

10 Claims, 5 Drawing Sheets

(56) References Cited

U.S. PATENT DOCUMENTS

| | | | |
|---|---|---|---|
| 2005/0114285 A1* | 5/2005 | Cincotta | 707/1 |
| 2005/0177603 A1* | 8/2005 | Shavit | 707/204 |
| 2006/0155729 A1* | 7/2006 | Aahlad et al. | 707/100 |
| 2006/0230103 A1 | 10/2006 | Takamoto et al. | |
| 2007/0156793 A1* | 7/2007 | D'Souza et al. | 707/204 |
| 2008/0091895 A1* | 4/2008 | Chen | 711/162 |
| 2008/0167896 A1* | 7/2008 | Fast et al. | 705/1 |
| 2009/0210427 A1* | 8/2009 | Eidler et al. | 707/10 |
| 2009/0222498 A1* | 9/2009 | Lu et al. | 707/204 |
| 2012/0198023 A1* | 8/2012 | Geist | 709/217 |

OTHER PUBLICATIONS

Shoo Hui; "Construction of Disaster Recovery Platform"; magazine—Guangdong Communication in Technology, p. 36-40; Issue 10 in 2006; published on Oct. 2006 in China, (abstract).

* cited by examiner

CENTRALIZED BACKUP SYSTEM AND BACKUP METHOD FOR AN HOMOGENEOUS REAL-TIME SYSTEM AT DIFFERENT LOCATIONS

CROSS-REFERENCE TO RELATED APPLICATIONS

The present application claims the benefit of International PCT/CN2009/000894 filed on Aug. 7, 2009, and Chinese Application No. 200810200564.4 filed Sep. 26, 2008, hereby incorporated herein by reference in their entirety.

FIELD OF THE PRESENT INVENTION

The present invention relates to a banking system, more particularly, to a system for centralizedly backuping non-local homogeneous real-time system in the banking system.

BACKGROUND OF THE INVENTION

Real-time systems are generally used in the banking industry. Backuping the real-time system is essential due to the particularity of the banking industry. Currently, low cost backup solutions of real-time systems are mostly limited in one computer room, due to the data reproduction between the primary and backup system.

A commonly used solution these days is to place each of the systems having the real-time systems with the same structure at different locations. Each of the real-time systems has its own backup system, and there are no connections between backup systems. When a primary system encounters failure, its backup system can be started to replace the primary system and process the transactions. Considering the system architecture, the original primary system needs to be completely separated from the network, and the backup system will be connected to the network after completely inheriting all the parameters of the primary system, without affecting other systems outside this system.

However, it costs too much to build such a system and needs much effort to maintain the system, decreasing the input-output ratio of the backup system. Moreover, since every operator at each location is not always well-trained, accident trends to happen during the switching between the primary system and backup system. Therefore, there is a need for a backup system that can be centralizedly deployed and managed and can support all the locations.

SUMMARY OF THE INVENTION

A technical problem to be solved by the present system is to provide a low-cost, high-availability backup solution for a real-time system.

For the forgoing purpose, the present invention provides a centralized backup system for non-local homogeneous real-time systems, characterized by comprising a switch, and a host and a firewall connected with the switch; the host comprising a server, an optic fiber switch and a disk array, wherein the server controls the reproduction of the data of the non-local systems, ensures the synchronization between the reproduced data and the parent data in the non-local systems, and replaces the application function of a non-local system when the non-local system encounters failure; the disk array stores the reproduced data.

The present invention also provides a centralized backup method for non-local homogeneous real-time systems, characterized by comprising a switching step when a non-local system encounters failure and a restoring step when the failure is eliminated, wherein the switching step comprises: disconnecting the network of the non-local system; switching an application and the network; and starting a centralized backup system; the restoring step comprises: restoring the network of the non-local system; switching to restore the application and the network; and starting the non-local system, wherein the centralized backup system comprises a switch, and a host and a firewall connected with the switch, the host comprising a server, an optic fiber switch and a disk array; wherein the functions of the server comprising: controlling the reproduction of the data of the non-local systems, ensuring the synchronization between the reproduced data and the parent data in the non-local systems, and replacing the function of applications of a non-local system when the non-local system encounters failure; the disk array stores the reproduced data; and the firewall performs network switching when switching from the non-local system to the backup system, and wherein the server comprises a plurality of logic servers, each having its own databases on the disk array, and the logic servers include a data reproduction server and an application server.

The present invention also provides a non-local homogeneous real-time system, characterized by comprising a centralized backup system, a plurality of non-local systems, and a network, wherein the centralized backup system comprises a switch, and a host and a firewall connected with the switch, the host comprising a server, an optic fiber switch and a disk array, wherein the server controls the reproduction of the data of the non-local systems, ensures the synchronization between the reproduced data and the parent data in the non-local systems, and replaces the function of applications of a non-local system when the non-local system encounters failure; the disk array stores the reproduced data; the firewall performs network switching when switching from the non-local system to the backup system; the centralized backup system is connected to the network through the firewall; and the plurality of the non-local system are connected to the network.

The present invention ensures the reliability of the non-local systems and is able to allocate resources flexibly to meet the requirement of the tasks of system in each location different greatly with each other by centralized deployment and centralized management of backup systems in all locations.

BRIEF DESCRIPTION OF THE DRAWINGS

The present invention will be described in more details in conjunction with the following embodiments and drawings.

DETAILED DESCRIPTION

Figure 1:
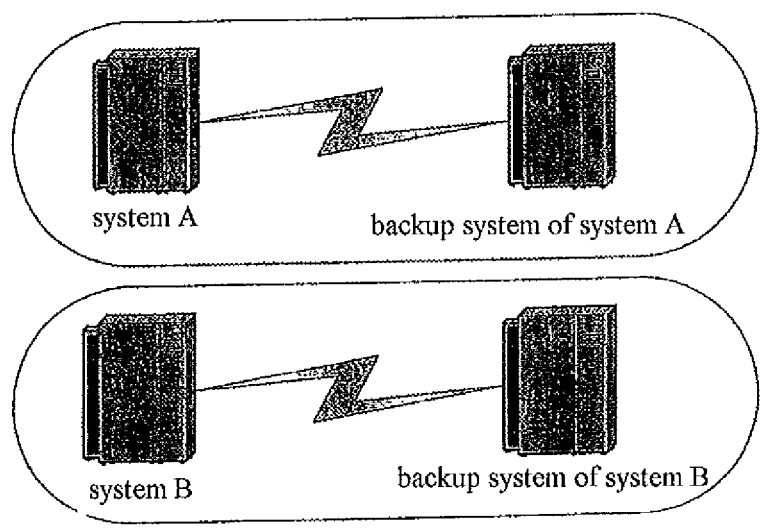
FIG. 1 illustrates the structure of existing primary and backup systems.
Figure 2:
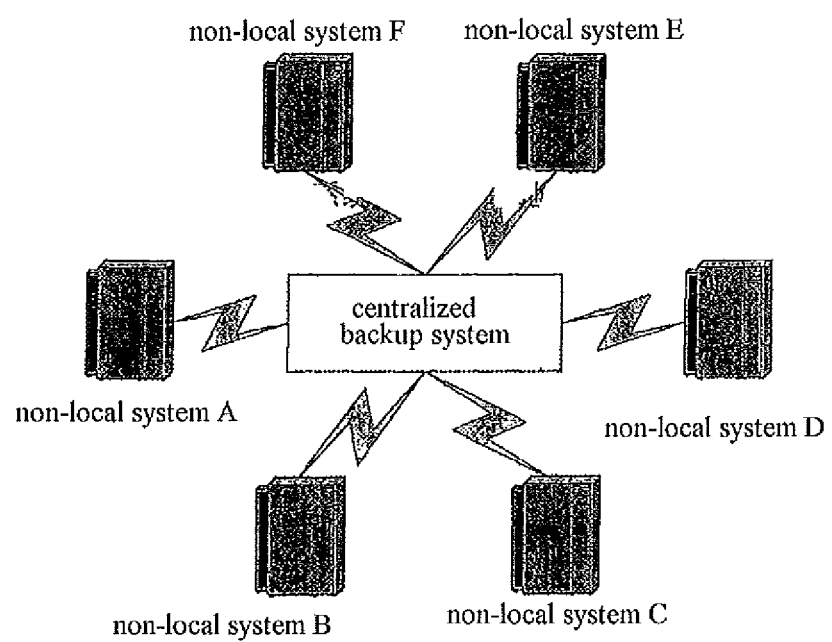
FIG. 2 illustrates the structure of primary and backup systems according to the present invention.

As shown in FIG. 2, non-local systems A-F are real-time processing systems with the same architecture which are placed at different locations, and share one "centralized backup system". The backup system is connected to each of the non-local systems by the wide area network for data reproduction. As used herein, the term "homogeneous" refers to the non-local systems having the same architecture, including operating system, database, and application software.

When a system in the systems A-F encounters failure, an administrator only needs to disconnect the connection between the system and the network, and then an administrator of the backup system starts the backup system to take over the failed system to process the transaction.

Figure 3:
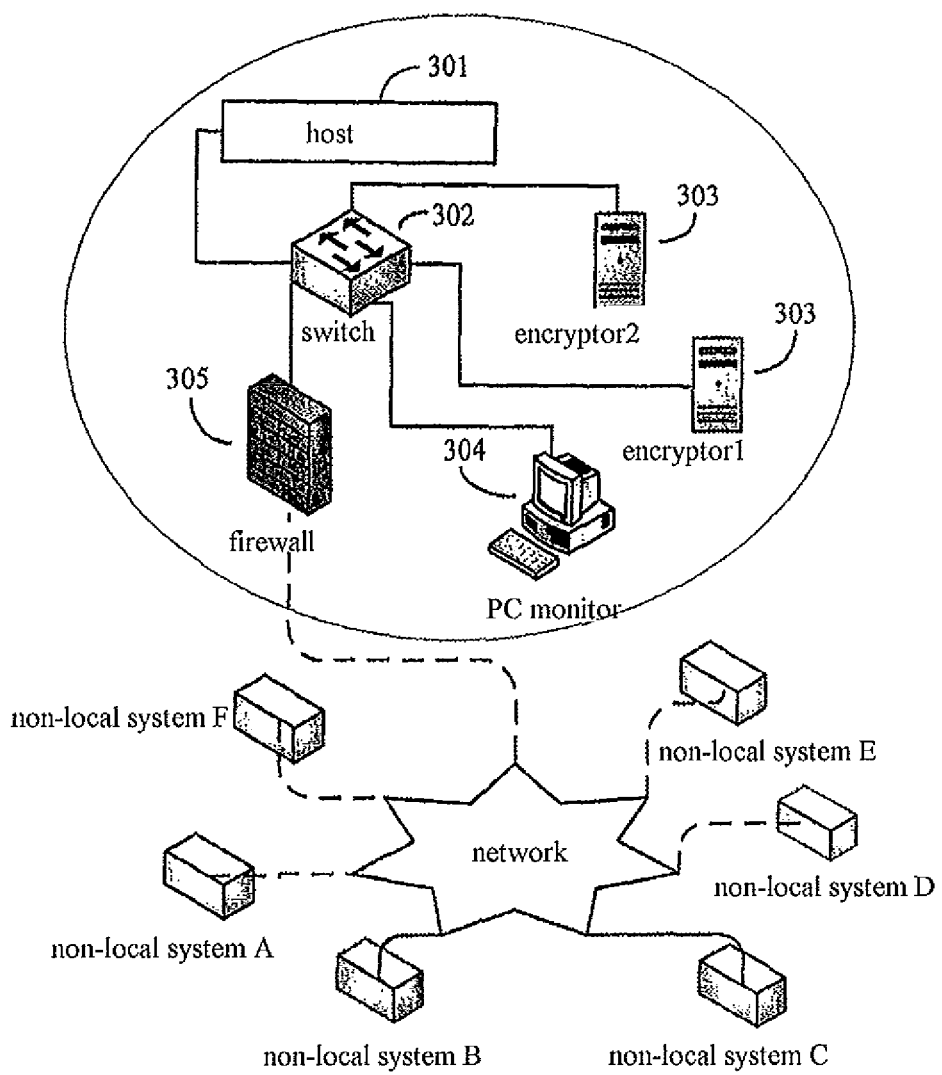
FIG. 3 illustrates a detailed architecture of the backup system according to the present invention.

FIG. 3 illustrates "a centralized backup system", comprising a host 301, a switch 302, an encryptor 303, a PC monitor 304 and a firewall 305. These devices are in the same local area network environment and are connected by solid lines. The core device associated with the applications is one host for replacing the non-local system. The core device associated with the network is the firewall, mainly used for network switching when switching from the non-local system to the host backup system. The switch is a basic network device for network data communication. The PC monitor may be used for monitoring each of the hosts of the backup system. The encryptor is a device common used in financial transactions.

When the non-local systems run properly, the non-local systems and other systems in the "network" perform data communication, and perform data reproduction with the backup system at the same time. The dashed lines in FIG. 3 show connectable state between the "centralized backup system" and the other systems in the real-time system.

When a non-local system falls in a failed state, the administrator of the non-local system disconnects the connection between the system and the network, and the administrator of the backup system starts the switching. After the backup system is switched and started, for the other systems in the "network", the failed "non-local system" runs properly again, and thus the goal to replace the non-local system with the backup system is achieved.

After the failure of the non-local system is eliminated, the network and applications will be restored from the backup system to the non-local system and the initial state is reached.

Figure 4:
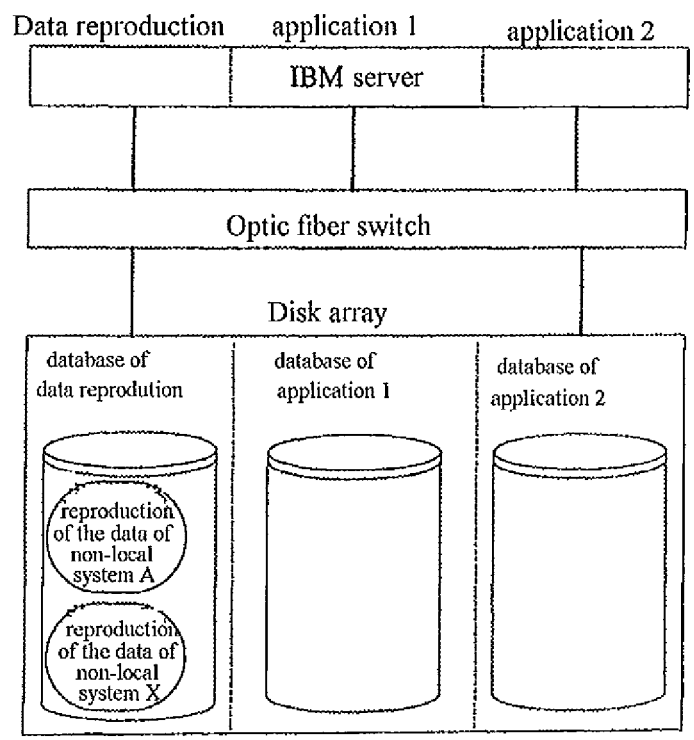
FIG. 4 illustrates the structure of the host in FIG. 3.

The "centralized backup system" needs to experience a switching process from the moment the non-local system runs properly to the moment the non-local system encounters failure, wherein the switching of applications and the switching of the network are two key points. Firstly, reference is made to FIG. 4, which shows the host in FIG. 3 in detail. It can be seen that the host system consists of a server, an optic fiber switch, and a disk array. The server is divided into three logic servers by using the Dynamic Logic Partitioning technology, with each of the logic servers having its own databases on the disk array as following: data reproduction server, administrating the data reproduction of the non-local systems and keeping the reproduced data and the respective parent data in synchronization; application server 1, served as backup system 1; application server 2, served as backup system 2.

When the application switching is performed, a reproduction of the data of the failed non-local system is imported from the data reproduction server into the application server 1, and then application 1 is started.

When the network switching is performed, on the firewall in FIG. 3, the IP address of the application server 1 is mapped outwards (i.e., to the "network") as the IP address of the failed non-local system, and thus the replacement is completed on the network.

Server can be designed to include a plurality of application servers in order to achieve simultaneous switching of a plurality of non-local systems.

Figure 5:
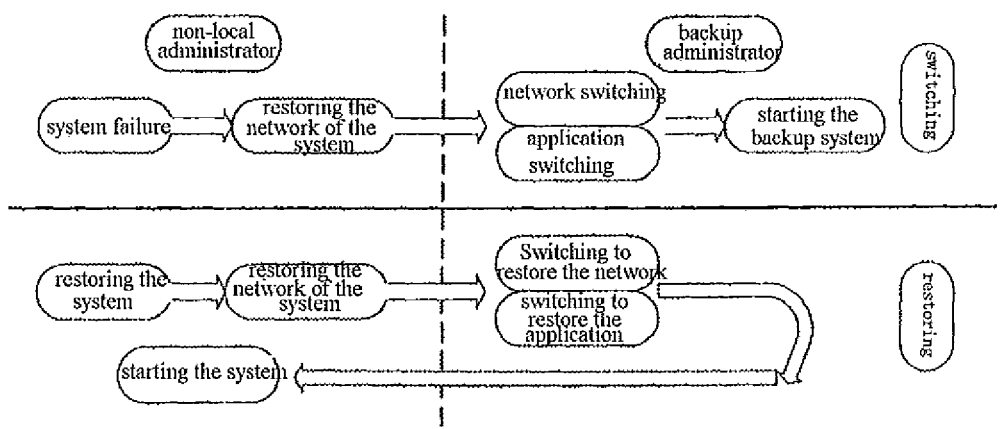
FIG. 5 illustrates the workflow of the backup system according to the present invention.

The workflow of switching and restoring is shown in FIG. 5. Under the operation with the workflow of FIG. 5, the operations of the switching are mainly performed by the administrator of the backup system, while the operations of the administrator of the non-local system are easy, thus reducing the cost of training and management.

The implementation of the present invention verifies that the effect of the present invention meets our expectation. Firstly, the data reproduction between the non-local and backup systems will hardly influence the reliability of the non-local system after being optimized. Secondly, the backup system after the switching is able to achieve the peak of the transaction processing capability of the non-local system. Finally, the backup system is able to allocate resources flexibly to meet the requirement of the tasks of system in each location different greatly with each other by the function of dynamically allocating resources.

What is claimed is:

1. A centralized backup system comprising:
   at least first and second non-local homogenous real-time systems each generating parent data;
   a switch;
   a firewall connected between the first non-local homogenous real-time system and the switch and connected between the second non-local homogenous real-time system and the switch; and
   a host comprising a server, an optic fiber switch and a disk array, the optic fiber switch connecting the server with the disk array, the switch connected between the firewall and the host, controlling a first data set, the first data set stored on the disk array, the first data set including a reproduction of the parent data of the first non-local homogenous real-time system, and the server controlling a second data set, the second data set including a reproduction of the parent data of the second non-local homogenous real-time system, the second data set stored on the disk array, and the server keeping reproduced data including one of the first and second data sets in a data reproduction server on the disk array in synchronization with the parent data of the first and second non-local homogenous real-time systems respectively so that the reproduced data includes a reproduction of the parent data at a failure condition of each of the first non-local homogenous real-time system and the second non-local homogenous real-time system, and the server also keeping an application server with a backup system on the disk array,
   wherein the server controls an application switching and the firewall controls a network switching, the application switching including an importation by the server of the reproduced data to the application server from the data reproduction server for use with the backup system of the application server, and the network switching including a mapping outward by the firewall as an IP address of the application server the IP address of the one of the first non-local homogenous real-time system and the second non-local homogenous real-time system encountering the failure condition, to enable the server to replace the first non-local homogenous real-time system using the first data set when the first non-local homogenous real-time system encounters the failure condition and to replace the second non-local homogenous real-time system using the second data set when the second non-local homogenous real-time system encounters the failure condition.

2. The centralized backup system of claim 1, wherein the server comprises a plurality of logic servers, each of the plurality of logic servers having at least one logic server database on the disk array.

3. The centralized backup system of claim 2, wherein the server includes the data reproduction server and the application server.

4. The centralized backup system of claim 1, further comprising an encryptor connected to the switch.

5. The centralized backup system of claim 1, further comprising a PC monitor connected to the switch.

6. In a centralized backup system having at least first and second non-local homogenous real-time systems each generating parent data, a switch, a firewall connected between the first non-local homogenous real-time system and the switch and connected between the second non-local homogenous real-time system and the switch, and a host comprising a server, an optic fiber switch and a disk array, the optic fiber switch connecting the server with the disk array, the switch connected between the firewall and the host, the server controlling a first data set, the first data set stored on the disk array, the first data set including a reproduction of the parent data of the first non-local homogenous real-time system, and the server controlling a second data set, the second data set including a reproduction of the parent data of the second non-local homogenous real-time system, the second data set stored on the disk array, and the server keeping reproduced data including one of the first and second data sets in a data reproduction server on the disk array in synchronization with the parent data of the first and second non-local homogenous real-time systems respectively so that the reproduced data includes a reproduction of the parent data at a failure condition of each of the first non-local homogenous real-time system and the second non-local homogenous real-time system, and the server also keeping an application server with a backup system on the disk array, wherein the server controls an application switching and the firewall controls a network switching, the application switching including an importation by the server of the reproduced data to the application server from the data reproduction server for use with the backup system of the application server, and the network switching including a mapping outward by the firewall as the IP address of the application server the IP address of the one of the first non-local homogenous real-time system and the second non-local homogenous real-time system encountering the failure condition, to enable the server to replace the first non-local homogenous real-time system using the first data set when the first non-local homogenous real-time system encounters the failure condition and to replace the second non-local homogenous real-time system using the second data set when the second non-local homogenous real-time system encounters the failure condition,
a backup method comprising:
operating the server to keep the reproduced data in the first and second data sets in synchronization with the parent data of the first and second non-local homogenous real-time systems respectively so that the reproduced data includes the reproduction of the parent data at the failure condition of each of the first non-local homogenous real-time system and the second non-local homogenous real-time system;
disconnecting a one of the first and second non-local homogenous real-time systems from the centrally located server when the one of the first and second non-local homogenous real-time systems encounters the failure condition;
replacing the one of the first and second non-local homogenous real-time systems with the centrally located server, the server using the corresponding one of the first and second data sets;
reconnecting the one of the first and second non-local homogenous real-time systems when the failure condition is removed; and
restoring operation of the one of the first and second non-local homogenous real-time systems.

7. The backup method of claim 6, after the disconnecting step, further comprising:
importing the corresponding one of the first and second data sets to the application server resident on the centrally located server;
starting the application server; and
mapping outwards the IP address of the application server as the IP address of the one non-local homogenous real-time system encountering the failure condition.

8. A non-local homogeneous real-time system, comprising:
a centralized backup system, the centralized backup system including a switch, a host and a firewall connected with the switch, the host further including a server, an optic fiber switch and a disk array, the switch connected between the firewall and the host;
a plurality of non-local homogenous real-time systems each generating parent data; and
a network, the network interconnecting the centralized backup system and the plurality of non-local homogenous real-time systems, the centralized backup system connected to the network through the firewall;
wherein the server controls a plurality of data sets, the data sets stored on in an data reproduction server on the disk array, each of the data sets having reproduced data including a synchronized reproduction of the parent data of an associated one of the plurality of non-local homogenous real-time systems so that the reproduced data includes a reproduction of the parent data at a failure condition of each of the non-local homogenous real-time systems, and the server also storing an application server with a backup system on the disk array, and
wherein the server controls an application switching and the firewall controls a network switching, the application switching including an importation by the server of the reproduced data to the application server from the data reproduction server for use with the backup system of the application server, and the network switching including a mapping outward by the firewall as an IP address of the application server the IP address of one of the non-local homogenous real-time systems encountering the failure condition, to enable the server to replace any of the plurality of non-local homogenous real-time systems using the associated data set stored on the disk array when any of the plurality of non-local homogenous real-time systems encounters the failure condition.

9. The non-local homogeneous real-time system of claim 8, wherein the server comprises a plurality of logic servers, each of the plurality of logic servers having at least one logic server database on the disk array.

10. The non-local homogeneous real-time system of claim 9, wherein each of the logic servers includes the data reproduction server and the application server.

* * * * *